United States Patent
Hsu (10) Patent No.: US 6,730,875 B2
(45) Date of Patent: May 4, 2004

(54) SYSTEM AND METHOD FOR ESTIMATING TRUE HEATS OF WELDING PROCESSES

(75) Inventor: Christopher Hsu, Mentor, OH (US)

(73) Assignee: Lincoln Global, Inc., Monterey Park, CA (US)

(*) Notice: Subject to any disclaimer, the term of this patent is extended or adjusted under 35 U.S.C. 154(b) by 30 days.

(21) Appl. No.: 10/252,574

(22) Filed: Sep. 24, 2002

(65) Prior Publication Data

US 2003/0071024 A1 Apr. 17, 2003

Related U.S. Application Data

(60) Provisional application No. 60/328,560, filed on Oct. 12, 2001.

(51) Int. Cl.[7] ................................. B23K 9/10
(52) U.S. Cl. ..................... 219/137 PS; 219/130.01; 219/130.33
(58) Field of Search .................. 219/137 PS, 130.01, 219/130.21, 130.33, 130.51

(56) References Cited

U.S. PATENT DOCUMENTS

| | | | |
|---|---|---|---|
| 4,794,232 A | * 12/1988 | Kimbrough et al. | ... 219/130.51 |
| 4,866,247 A | 9/1989 | Parks | |
| 5,148,001 A | 9/1992 | Stava | |
| 5,278,390 A | 1/1994 | Blankenship | |
| 6,002,104 A | 12/1999 | Hsu | |
| 6,051,810 A | 4/2000 | Stava | |

* cited by examiner

Primary Examiner—Clifford C. Shaw
(74) Attorney, Agent, or Firm—Fay, Sharpe, Fagan, Minnich & McKee (57) ABSTRACT

An arc welding apparatus (10) for performing a waveform-controlled arc welding process includes an arc welding torch (14) that interacts with an associated weld. A power supply (12) applies a selected waveform-controlled power to the welding load via the arc welding torch (14) and a grounding cable over a process interval ($T_{weld}$). The power supply (12) includes a sampling circuit (34) for sampling instantaneous current and voltage values of the power during a snip portion ($T_{snip}$) of the process interval ($T_{weld}$). A processor (40) is designed to (i) compute a true heat over the snip portion ($T_{snip}$) of the process interval ($T_{weld}$), and (ii) extrapolate a true heat over the process interval ($T_{weld}$) based thereon.

35 Claims, 7 Drawing Sheets

SYSTEM AND METHOD FOR ESTIMATING TRUE HEATS OF WELDING PROCESSES

This application claims the benefit of U.S. Provisional Application No. 60/328,560, filed Oct. 12, 2001.

The present invention relates to the welding arts, and more particularly relates to measurement of a true heat produced by an electric arc welder that performs a waveform-controlled welding process, and will be described with particular reference thereto.

INCORPORATION BY REFERENCE

In the field of electric arc welding of the type especially useful in pipe welding, weld puddle temperature and fluidity are controlled by using a variety of welding processes including an arc welding process known as surface tension transfer (STT) welding. This technology was developed and patented by The Lincoln Electric Company, and is disclosed in several patents, including Parks U.S. Pat. No. 4,866,247, Stava U.S. Pat. No. 5,148,001, and Stava U.S. Pat. No. 6,051,810, which are incorporated herein by reference. These patents show STT welding technology in which the present invention is preferably used. Since this technology is well known, incorporation by reference of these patents provides general background information for understanding the preferred implementation of the invention. In practicing STT short circuit welding, a waveform generator produces a precise waveform used in the welding process by creating a series of current pulses the widths of which determine the current flowing in the welding process during specific portions of the cycle. In practicing this type of electric arc welding, as well as other short circuit processes, it is common to use a Power Wave electric arc welder available from the Lincoln Electric Company. Such inverter-based welders are disclosed in Blankenship U.S. Pat. No. 5,278,390 and Hsu U.S. Pat. No. 6,002,104. These patents are also incorporated by reference to disclose the general type of welder used to implement preferred embodiments of the present invention.

BACKGROUND OF THE INVENTION

In conventional electric arc welding a power source of a constant power, constant voltage, or constant current type delivers electrical power to a weld material arranged in proximity to a weld. The electrical power causes melting of weld material and electrically assisted transfer of the molten weld material across an arc gap to a weld puddle. The weld material is delivered toward the weld via a wire feeder or other arrangement.

In conventional arc welding, the electrical power delivered to the weld is selected to control transfer of weld material to the weld puddle. In short-arc transfer, the electrical power forms a molten drop of weld metal which engages the weld puddle and is then pinched off by high current density. Each drop transfer is caused by a short-circuit that is controlled by a waveform generator. In a short-arc welding process, tens to a few hundred shorts occur per second. In a variant process called pulse welding, detachment of molten drops occur during each of a series of current pulses.

To control the welding process, welding power sources that provide waveform control have been developed. These power sources deliver a series of selectively shaped electrical power waveforms to the weld. The power waveform is optimized for a selected arc welding process, weld metal, wire feed speed, weld joint, and the like. With a suitably tailored waveform, such waveform-controlled power sources improve the speed, consistency, and robustness of the welding process, can substantially improve arc stability and reduce weld metal spatter, and can otherwise optimize the welding process.

In a typical arrangement for waveform-controlled arc welding, a power source providing waveform control interfaces with a user interface computer such as a personal computer, PDA, cell phone, or the like. The computer includes software through which a user can design a selected waveform and communicate the waveform to the power source. The computer further includes control and monitoring software for initiating, controlling, and monitoring the arc welding.

In electric arc welding processes, an important process parameter is the total electrical power or true heat that is input to the weld over the course of a welding process. For conventional arc welding processes, the true heat is suitably characterized by measuring root-mean-square (RMS) voltage and current values and multiplying RMS current by RMS voltage to obtain an RMS true heat value.

A problem arises when using waveform control in that the true heat is not readily measured because the current varies during each of the tailored waveforms. This is especially true between arc conditions and shorted conditions. In particular, in waveform controlled arc welding the product of the RMS current and voltage do not yield an accurate true heat due to phase differences between the current and voltage waveforms which can produce apparent (voltampere) power in addition to real power.

One solution to this problem is to continuously measure the instantaneous current and voltage values and to multiply the measured instantaneous current and voltage values to compute an instantaneous power, which is integrated to determine the true heat. This solution calls for expensive high-speed data communication and data processing hardware. However, data communication and processing hardware used in typical arc welding systems are not fast enough to transfer and process the large volume of instantaneous sampled electrical data produced. Moreover, even if they were fast enough to accomplish true heat monitoring, such process will consume a large portion of the process capacity of the welder's controller.

The present invention contemplates an improved apparatus and method that overcomes the aforementioned limitations and others.

SUMMARY OF THE INVENTION

According to one aspect of the invention, a method is provided for controlling a welding process. A snip of current and voltage samples is measured over a measured portion of the welding process. Based on the snip, a true heat produced during the measured portion of the welding process is computed. The true heat produced during the measured portion is extrapolated over an unmeasured portion of the welding process to produce a true heat value. A welding process parameter is adjusted based on the true heat value.

According to another aspect of the invention, a closed-loop control system is disclosed for a welder that performs a waveform-controlled electric arc welding process. A sampling circuit samples instantaneous current and voltage values of the waveform-controlled electric arc welding process during a snip interval. A true heat processor computes a true heat over the snip interval and extrapolates a true heat over the snip interval plus a delay interval. A true heat setpoint adjustment outputs a selected setpoint true heat value. A controller controls a parameter of the waveform-controlled electric arc welding process based on the extrapolated true heat over the snip interval plus the delay interval and the selected setpoint true heat value.

According to another aspect of the invention, a closed-loop control system is disclosed for a welder that performs a waveform-controlled electric arc welding process. A sampling circuit samples current and voltage values of the waveform-controlled power during a snip measurement interval. A voltage sample thresholding circuit selects voltage sample values corresponding to one of a short condition and an arc condition. A true heat processor computes a true heat over the snip measurement interval by integrating a product of voltage sample values selected by the voltage sample thresholding circuit and corresponding current sample values to estimate a true heat in one of the arc and the short. A controller adjusts the waveform-controlled electric arc welding process to maintain the estimated true heat at a desired value.

According to another aspect of the invention, a method is provided for estimating a true heat of a welding process performed over a welding process interval. A voltage and a current applied by the welding process is sampled over a snip measurement interval that is smaller than the welding process interval. Corresponding sampled voltage and current values are multiplied to generate sampled power values. The sampled power values are integrated over the snip measurement interval to compute a sampled true heat produced during the snip measurement interval. Based on the sampled true heat produced during the snip measurement interval, the true heat of the welding process produced during the welding process interval is estimated, preferably by extrapolation.

According to yet another aspect of the invention, an arc welding apparatus is disclosed for performing a waveform-controlled arc welding process. An arc welding torch interacts with an associated weld. A power supply applies a selected waveform-controlled power to the weld via the arc welding torch over a process interval. The power supply includes a sampling circuit for sampling instantaneous current and voltage values of the power during a snip portion of the process interval. A processor is designed to (i) compute a true heat over the snip portion of the process interval, and (ii) extrapolate a true heat over the process interval based thereon.

According to still yet another aspect of the invention, a method is provided for estimating a true heat of a welding process performed over a welding process interval. A voltage and a current applied to the weld are sampled over a snip interval that spans at least a portion of the welding process interval. Corresponding sampled voltage and current values are multiplied to generate sampled power values. Each sampled power value is classified as one of a sampled short power value and a sampled arc power value. A true heat in the short over the welding process interval is computed based on the sampled short power values. A true heat in the arc over the welding process interval is computed based on the sampled arc power values.

Numerous advantages and benefits of the present invention will become apparent to those of ordinary skill in the art upon reading the following detailed description of the preferred embodiment.

BRIEF DESCRIPTION OF THE DRAWINGS

The invention may take form in various components and arrangements of components, and in various process operations and arrangements of process operations. The drawings are only for the purpose of illustrating preferred embodiments and are not to be construed as limiting the invention.

The quantitative dimensions of time intervals and frequencies shown in FIGS. 2-5 are selected for clarity of presentation. Preferred or exemplary values for salient time intervals and frequencies are provided in the Detailed Description given below.

DETAILED DESCRIPTION OF THE PREFERRED EMBODIMENTS

Figure 1:
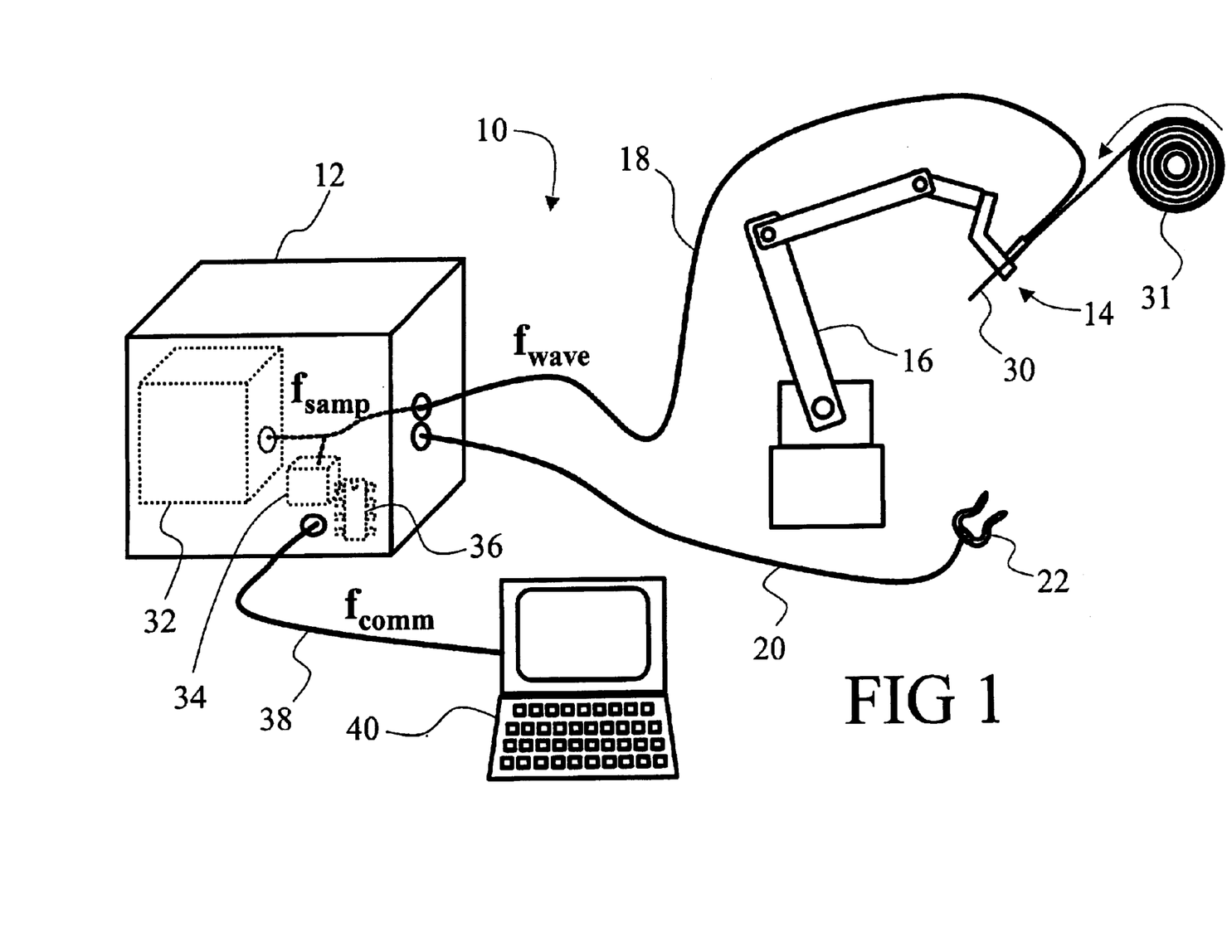
FIG. 1 shows an exemplary electric arc welding formed in accordance with one embodiment of the invention.

With reference to FIG. 1, an electric arc welding apparatus 10 for waveform controlled arc welding includes a power supply 12 that supplies power to a welding gun or welding torch 14 mounted on a robotic apparatus 16. A welding cable or lead 18 connects the power supply 12 with the welding torch 14, while, a work cable or lead 20 electrically connects the power supply 12 to a workpiece (not shown) via a clamp 22 or other electrical connection to define an electrical circuit including at least the power supply 12, the welding cable 18, the welding gun 14, the workpiece (or a portion thereof), and the work cable 20.

The welding gun or torch 14 includes a welding wire 30 that is fed toward a piece being welded from a supply, shown as a spool 31. A power converter such as an inverter 32 receives an input power such as a 120 volt a.c., 230 volt a.c., 480 volt a.c. three-phase, et cetera, electrical power input and generates a selected waveform-controlled power therefrom which is output to the welding cable 18. The waveform can be a series of electrical pulses, or a more complex waveform, and is suitably generated by a standard waveform generator. The inverter 32 generates an arc current applied to the weld in accordance with the waveform. In a short-arc welding process the waveform includes an arc portion during which a drop of weld material forms, and a short portion during which the weld drop transfers to the weld puddle. This is all standard technology.

With continuing reference to FIG. 1, in waveform controlled arc welding the inverter 32 produces a periodically time-varying current that is applied to the load electrode stickout, arc, puddle, and cable gun. The waveform train, and hence the corresponding periodically time-varying current, has a base frequency $f_{wave}$ which in one preferred embodiment is generally around 100 to 200 cycles per second. Power supply 12 further includes an electrical measuring circuit or device 34 that performs analog-todigital sampling of electrical current and voltage produced by the inverter 32. The sampling is performed at a high sampling frequency $f_{samp}$, e.g. 10 kHz to 40 kHz or higher, to ensure adequate sampling of around 100–400 samples or more per waveform to characterize the welding process.

The digital sampling data is generated at a high rate, for a sixteen-bit analog-to-digital (A/D) converter sampling current and voltage at 10 kHz to 40 kHz. A buffer memory 36 preferably temporarily stores the sampled instantaneous current and voltage values. A digital communication path 38, such as an Ethernet connection, a serial connection, or the like, communicates the sampled current and voltage instantaneous values to a user interface device such as a computer 40 or other processor. Optionally, the digital communication path 38 is a wireless communication path, such as a wireless local area network or a bluetooth™ wireless communication path.

The user interface computer 40 preferably includes a graphical user interface (GUI), such as is shown in Hsu U.S. Pat. No. 6,002,104, although a text-based interface is also contemplated. In addition to receiving arc welding monitoring data such as instantaneous current and voltage samples, the user interface computer 40 preferably allows a user to construct selected power waveforms that are suitable for specific combinations of weld metal, workpiece metal, wire feed speed, a selected welding process, and the like. Moreover, the user interface computer 40 preferably allows the user to communicate the waveform to the waveform controlled power supply 12, and initiate, control, and monitor the arc welding process. With continuing reference to FIG. 1 and with further reference to FIGS. 2 and 3, in waveform controlled arc welding, inverter 32 of the power supply 12 produces a weld process 50 including a series of current waveforms F. Each waveform F has a waveform period $T_{wave}$.

Figure 2:
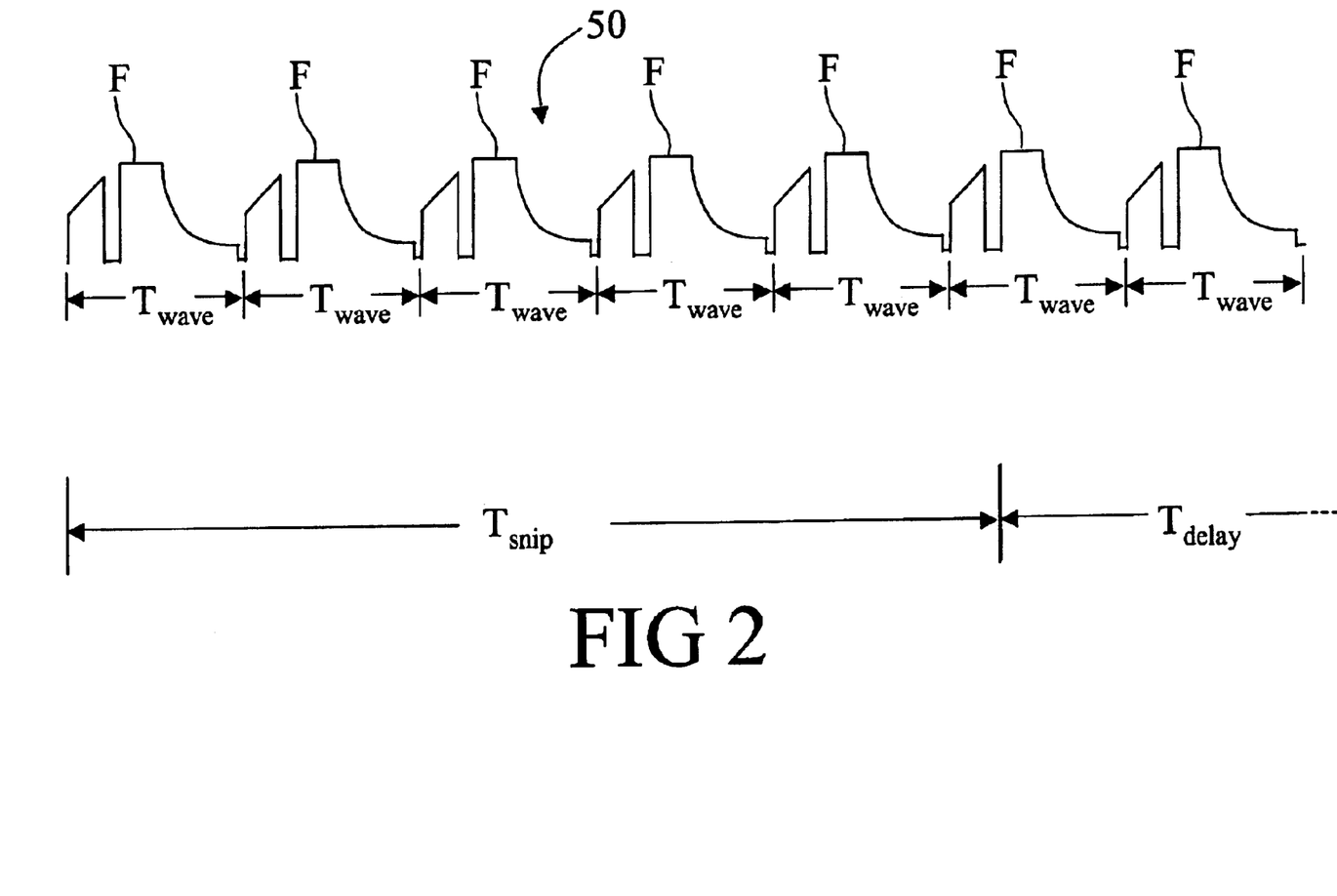
FIG. 2 shows a portion of a welding process including a series of current waveforms input to the weld during a welding operation, with selected temporal quantities indicated.
Figure 3:
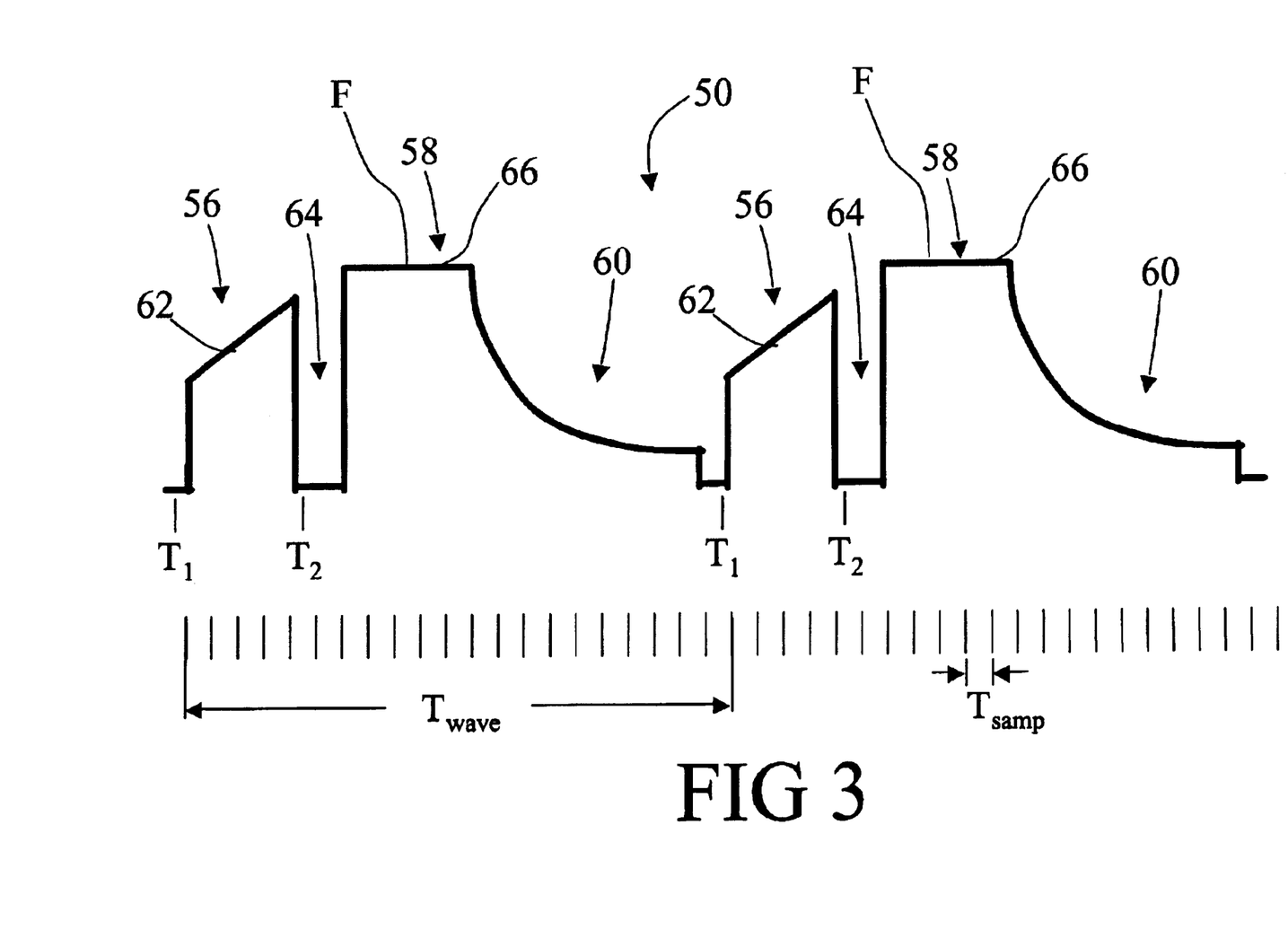
FIG. 3 shows a close-up of two periods in the series of waveforms of FIG. 2, with sampling times indicated.

The exemplary current waveform F suitably implements a surface tension transfer (STT) welding process. The waveform F includes a short condition region 56, an arc condition region 58, and a slope-out region 60. The current waveform F represents the current flowing through the weld, and is in a preferred embodiment generated by inverter 32 in response to a pulse-width modulated (PWM) current pulse train in which the pulse width controls an amplitude of current waveform F. However, other current control techniques can be employed.

As is known in the art, short circuit welding includes alternating between an arc or plasma condition and a short condition during which metal transfer occurs. In the current waveform F, the short condition 62 is initiated at a time $T_1$ when a molten metal ball disposed at an end of the wire 30 contacts the workpiece. Metal passes from the wire 30 to the workpiece by surface tension and momentum created by pinch force during the short condition region 56. In the STT waveform, this surface tension transfer is assisted or accelerated by a pinch pulse 62 that ramps the current in a controlled fashion between the contact time $T_1$ and a separation time $T_2$. Preferably, the pinch pulse 62 terminates or includes a rapidly decreasing region just prior to the separation time $T_2$ to reduce spatter.

After a short delay period 64, the current rises rapidly in the arc condition region 58 to generate a plasma boost pulse 66. The plasma boost pulse 66 is held for a time to deliver a selected quantity of energy to the tip of the wire 30 to form a new molten metal ball. Waveform F then transitions along the tailout region 60 to a selected background voltage level preparatory to the next contact time $T_1$.

Although the preferred STT welding process is described herein, it will be appreciated that other waveform-controlled welding processes can be used, with waveform parameters and overall shape depending upon the type of metals involved, the type of welding process, and the like. Typically, the waveform period $T_{wave}$ ranges between about 3 msec and 15 msec, although other waveform periods can also be used.

To sample the weld process 50 sufficiently, the sampling frequency $f_{samp}$ should substantially exceed a waveform frequency $f_{wave}$, which is related in inverse fashion to the waveform period $T_{wave}$, i.e. $f_{wave}=1/T_{wave}$. Similarly, a sampling period $T_{samp}$ is inversely related to the sampling frequency $f_{samp}$ according to $T_{samp}=1/f_{samp}$. Although FIG. 3 shows only about twenty samples per waveform period $T_{wave}$, in preferred embodiments around one hundred or more samples per waveform are acquired, corresponding to a sampling rate $f_{samp}$ in the range 10 kHz to 40 kHz for typical waveform frequencies $f_{wave}$.

The digital communication path 38 is preferably a low-cost and low-speed communication path, since most user interface functions of the electric arc welding apparatus 10 do not require high speed communication. The preferred low-speed communication path 38 does not transfer the digitized instantaneous current and voltage values at the data acquisition digital bit rate.

Rather, with continuing reference to FIGS. 1–3 the electrical measuring device 34 acquires data at high sampling rates and buffers the data into the buffer memory 36 during a snip measurement period $T_{snip}$, which typically extends over a few tens of milliseconds. The snip measurement period $T_{snip}$ is followed by a delay period $T_{delay}$ during which sampling does not occur, or during which the sampled data is not stored in the buffer memory 36.

Figure 4:
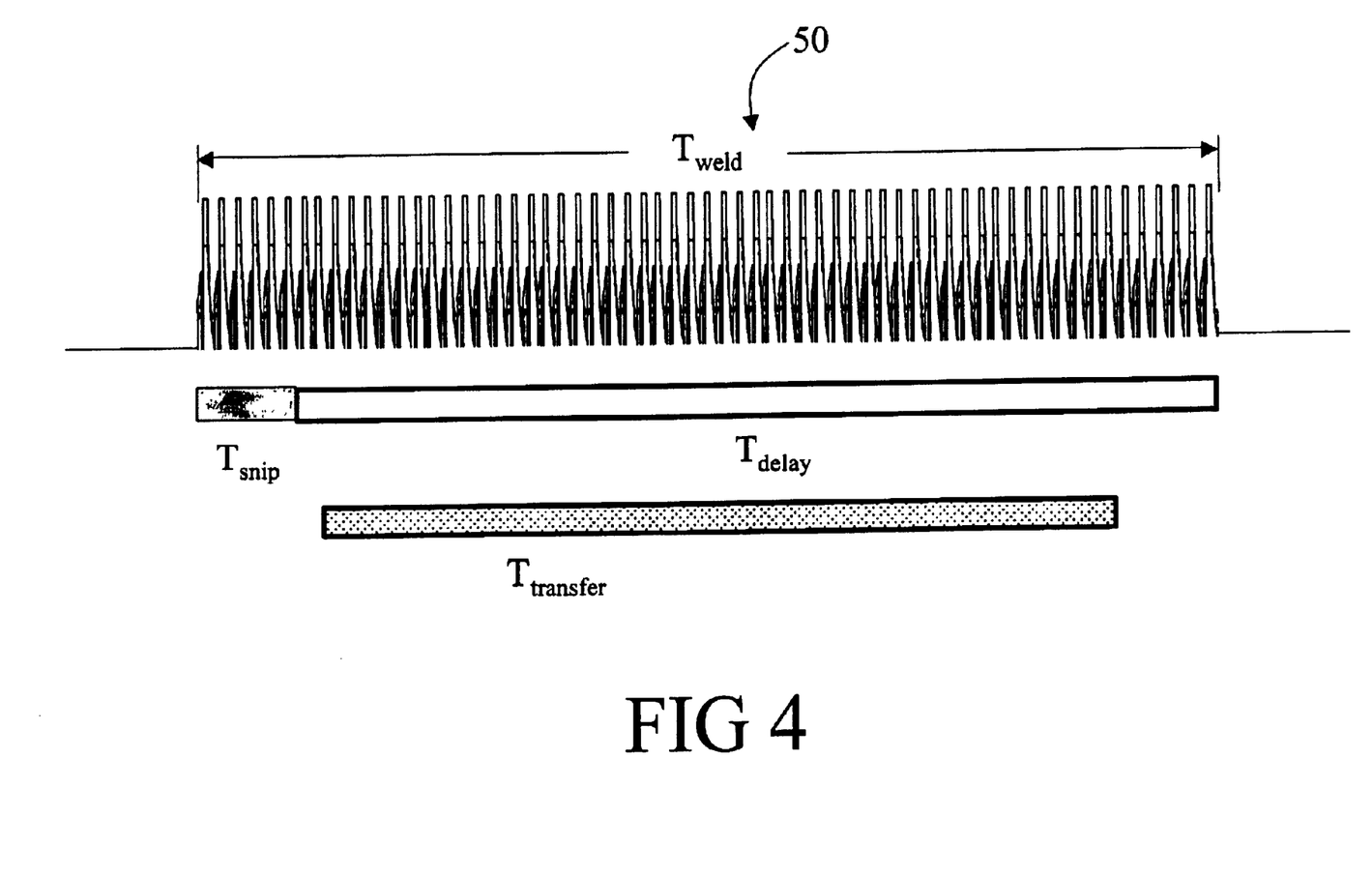
FIG. 4 shows one suitable arrangement of a snip interval and an unsampled delay interval for measuring a true heat produced in an arc welding process.
Figure 5:
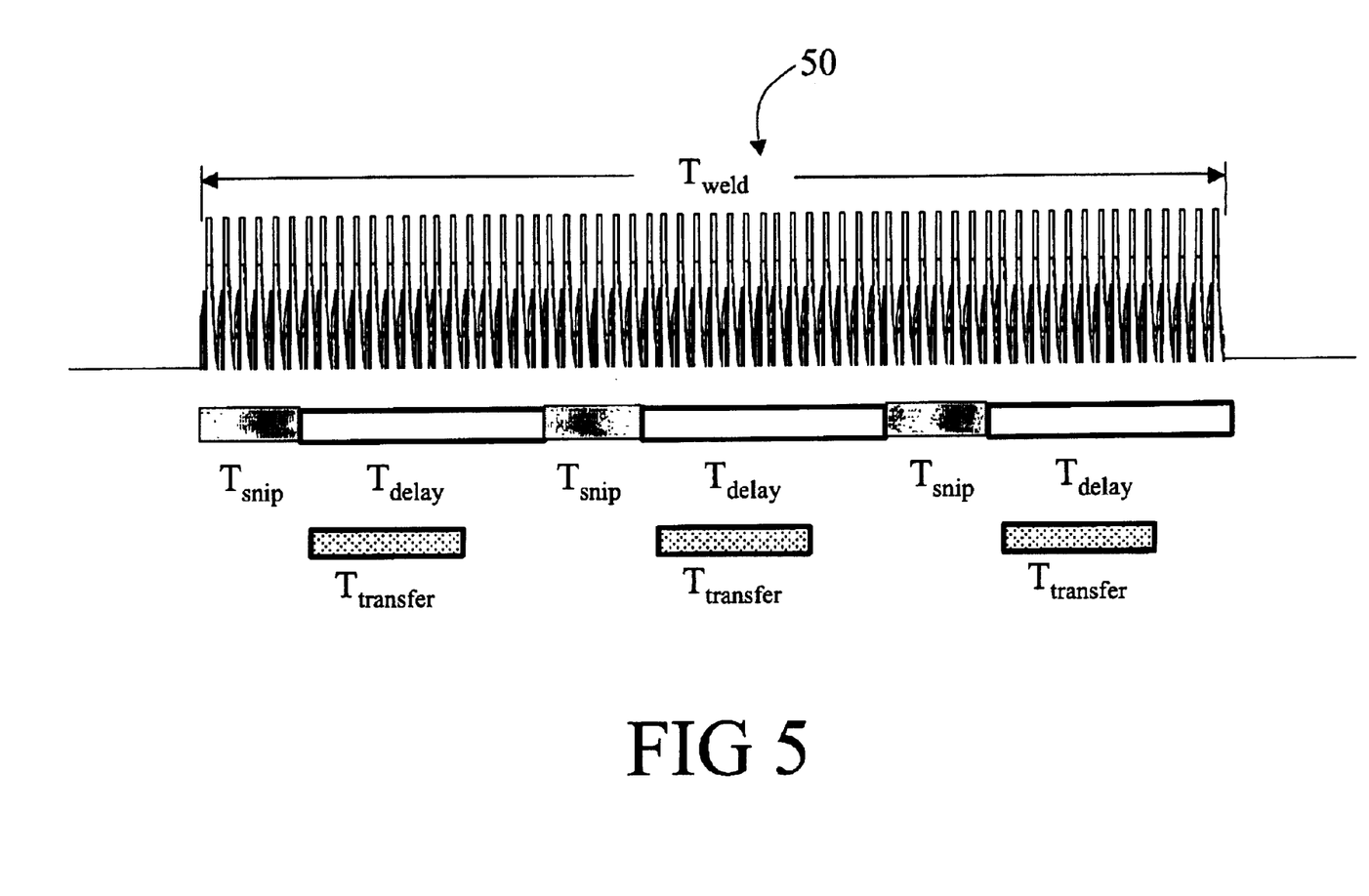
FIG. 5 shows another suitable arrangement of snip intervals and unsampled delay intervals for measuring a true heat produced in an arc welding process.

With continuing reference to FIGS. 1–3 and with further reference to FIGS. 4 and 5, the buffered current and voltage samples are transmitted via the communication path 38 to the user interface computer 40 during a transfer period $T_{transfer}$ which extends in one preferred embodiment over a hundred milliseconds or longer. However, transfer periods shorter than one hundred milliseconds can also be used. To estimate a true heat delivered to the weld during a welding process interval $T_{weld}$ (where the welding process interval $T_{weld}$ is typically around one second or longer), one or more measurement snips of duration $T_{snip}$, which are sub-intervals of the welding process interval $T_{weld}$, are distributed over the welding time $T_{weld}$. Each snip interval has a corresponding unsampled delay period or delay sub-interval $T_{delay}$. The data transfer period $T_{transfer}$ lies within or substantially coincides with an unsampled delay interval or period $T_{delay}$.

FIG. 4 shows an exemplary timing diagram in which a single contiguous snip measurement interval $T_{snip}$ is followed by a single contiguous delay period $T_{delay}$, which extends longer than the data transfer period $T_{transfer}$ such that the data transfer occurs within the unsampled delay period $T_{delay}$.

FIG. 5 shows another exemplary timing diagram in which a plurality of non-contiguous snip measurement periods $T_{snip}$, specifically three exemplary snip measurement periods $T_{snip}$ in FIG. 5, are distributed along the welding time interval $T_{weld}$. Following each snip measurement period $T_{snip}$ is a corresponding unsampled delay period $T_{delay}$ that includes a data transfer period $T_{transfer}$.

As seen in FIGS. 4 and 5, the snip measurement interval or periods $T_{snip}$ are representative of the welding process 50 that occurs over the welding interval $T_{weld}$. In the arrangement of FIG. 5 the snip measurement periods $T_{snip}$ are distributed across the welding interval $T_{weld}$, and so these snips typically provide more representative sampling than the arrangement of FIG. 4 in which the snip is measured near a beginning of the weld process 50. The distributed snip measurement arrangement of FIG. 5 can be more accurate where the welding process 50 varies over the welding process interval $T_{weld}$. However, the arrangement of FIG. 4 is suitable for typical welding processes which are substantially uniform across the welding period $T_{weld}$.

Figure 6:
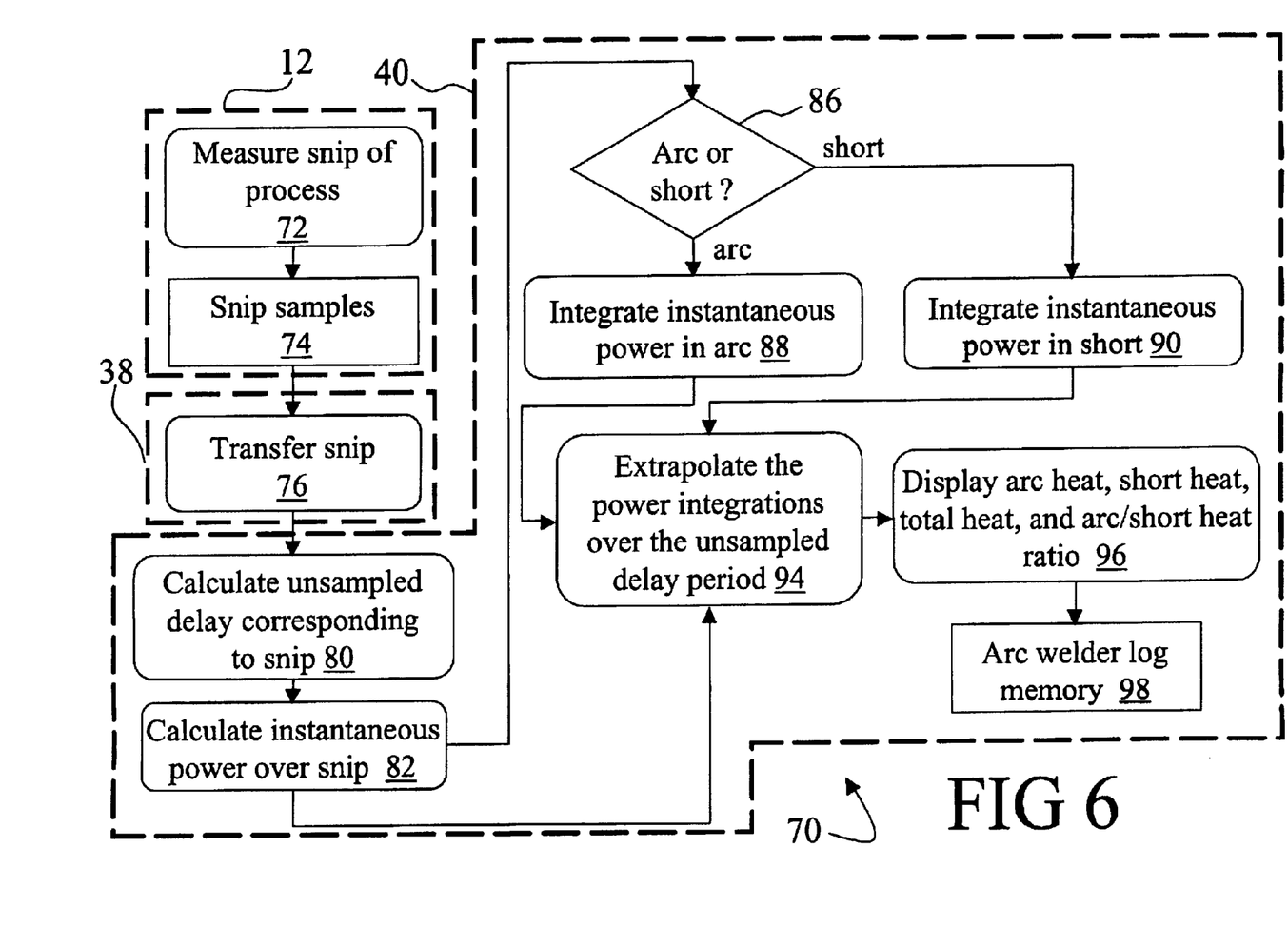
FIG. 6 shows a preferred method for estimating a true heat using measurement snips of instantaneous current and voltage samples.

With continuing reference to FIGS. 1–5 and with further reference to FIG. 6, a suitable method 70 for estimating a true heat based upon measurement snips of instantaneous current and voltage samples is described. A snip of welding process 50 including current and voltage sample values is measured 72. The snip measurement 72 is performed during snip measurement time interval or intervals $T_{snip}$ shown in FIGS. 2, 4, and 5. Preferably, the snip measurement 72 is performed in the power supply 12 using the electrical measuring circuit or device 34 which performs digital sampling via one or more A/D converters. Alternatively, externally arranged A/D converters electrically couple with the welding cable 18. The measured snip is stored as snip samples 74 in the buffer memory 36, which in the preferred, illustrated embodiment is arranged in the power supply 12. Alternatively, the memory 36 can be integrated with externally arranged A/D converters.

The sample snip includes a sequence of substantially instantaneous current and voltage samples acquired at a high sampling frequency $f_{samp}$ which is typically in a range of 10 kHz to 40 kHz or higher. The snip measurement time interval $T_{snip}$ is preferably around 50 msec, which for a welding process 50 including waveforms with a waveform period $T_{wave}$ of around 4 msec to 12 msec or higher ensures acquiring around one hundred samples or more per waveform. For relatively long waveform periods $T_{wave}$, a few waveforms, e.g. three waveforms, are preferably measured with a large number of samples per waveform. For shorter waveform periods $T_{wave}$, a larger number of cycles are preferably measured, e.g. ten or more cycles, with fewer samples taken from each waveform. Of course, those skilled in the art can select measurement snips with sampling rates $f_{samp}$ and snip measuring intervals $T_{snip}$ that are optimized to suitably measure waveforms with specific waveform periods and complexity.

In a transfer 76, the measurement snip 74 is transferred from the power supply 12 to the user interface computer 40 via the digital communication path 38. This transfer occurs during transfer time interval $T_{transfer}$ at a transfer rate $f_{comm}$ which is typically substantially lower than the data acquisition rate $f_{samp}$. The transfer 76 takes place during delay period $T_{delay}$ during which the welding process 50 continues but is not sampled.

Typically, the snip measurement interval $T_{snip}$ and the unsampled delay interval $T_{delay}$ are selected to substantially cover or span the welding process interval $T_{weld}$. Optionally, the snip measurement 72 and transfer 76 is repeated as shown in FIG. 5 for several snips to substantially cover or span the welding process interval $T_{weld}$ with sampling snips acquired over two or more discontinuous snip measurement time intervals $T_{snip}$, to provide a more representative sampling over the welding process interval $T_{weld}$. Each snip measurement time interval $T_{snip}$ is followed by a delay time interval $T_{delay}$. A ratio of the snip measurement time interval $T_{snip}$ to the delay time interval $T_{delay}$ is preferably selected to substantially maximize the snip measurement time interval $T_{snip}$.

The data transfer time interval $T_{transfer}$ is shown in FIGS. 4 and 5 as lying fully within the unsampled delay period or periods $T_{delay}$ during which the welding process 50 continues but is unsampled. However, it is also contemplated to allow the transfer time interval $T_{tranfer}$ to extend beyond the welding process interval $T_{weld}$. If, for example, it is known that welding process intervals $T_{weld}$ are separated by fixed idle time intervals, then a transfer time interval $T_{transfer}$ optionally extends into the known idle time interval.

Similarly, although the data transfer time interval $T_{transfer}$ is shown in FIGS. 4 and 5 as lying fully outside of the snip measurement time interval $T_{snip}$, it is also contemplated to begin the transfer 76 prior to completion of the snip measurement 72, so that the data transfer time interval $T_{transfer}$ partially overlaps the snip measurement time interval $T_{snip}$.

With continuing reference to FIGS. 1–5 and with particular reference to FIG. 6, the user interface computer 40 computes an unsampled delay time interval $T_{delay}$ corresponding to the snip measurement time interval $T_{snip}$. With particular reference to FIGS. 4 and 5, it will be observed that each snip measurement time interval $T_{snip}$ is followed by a delay period $T_{delay}$ during which the welding process 50 continues but is not sampled. The delay period $T_{delay}$ provides time for the slower communication path 38 to transfer the rapidly acquired sampling data to the user interface computer 40.

In one suitable approach, the delay computation 80 computes the delay $T_{delay}$ based on a preselected timing of the snip measurement and delay periods $T_{snip}$, $T_{delay}$. That is, the delay $T_{delay}$ is a known, predetermined time interval. Alternatively, the delay computation 80 computes the delay $T_{delay}$ using an internal timer (such timers are typically included on personal computers, laptop computers, workstations, and the like) which times an interval between synchronizing pulses sent by the electrical measuring device 34 indicating an end of the current snip measurement period $T_{snip}$ and a beginning of a second snip measurement period $T_{snip}$. That is, the delay period $T_{delay}$ is directly measured.

The above embodiments of the delay computation 80 are exemplary only. Those skilled in the art can readily construct other techniques for determining the unsampled delay time period $T_{delay}$ corresponding to each measurement snip measurement period $T_{snip}$.

With continuing reference to FIGS. 1–5 and with particular reference to FIG. 6, the measurement snip is integrated 82 to compute a sample true heat. A sampled instantaneous current for a sample n, designated $I_n$, and a corresponding sampled instantaneous voltage $V_n$ are suitably multiplied together to compute a sampled instantaneous power $P_n$. That is, $P_n = I_n \times V_n$ where $P_n$ is the instantaneous sampled power at the sample n. Hence, integration 82 suitably computes the sample true heat as:

$$\text{Sample True Heat} = \int_{T_{snip}} I(t)V(t)\,dt = T_{samp} \times \sum_n (I_n \times V_n) \qquad (1)$$

where I(t) and V(t) are the instantaneous current and voltage, respectively, $I_n$ and $V_n$ are current and voltage sample values at the sampling time n, $T_{snip}$ is the snip measurement time interval, and $T_{samp}$ is the sampling time interval. The sample true heat has dimensions of a heat, or an equivalently of an energy.

Instead of computing a true heat, an average power during the snip interval $T_{snip}$ can be computed according to:

$$\text{Average Power} = \frac{1}{N} \times \sum_n (I_n \times V_n) \quad (2)$$

where N is the number of samples acquired during the snip measurement period $T_{snip}$. The average power has dimensions of a power.

In a preferred embodiment, in addition to computing the true heat, it is advantageous to compute the true heat in the short, and the true heat in the arc. With particular reference to FIGS. 2 and 3, the exemplary waveform F suitably implements a surface tension transfer (STT) welding process known in the art. During the short condition region 56 of the waveform F, weld metal transfer conductively shorts the wire 30 and the workpiece and causes voltage between the wire 30 and the workpiece to decrease to a low value. During the arc condition region 58 of the waveform F a substantial voltage or potential difference between the wire 30 and the workpiece exists to maintain the arc or plasma condition.

Although described with respect to the exemplary STT welding process, those skilled in the art recognize that similar short and arc conditions occur during selected waveform portions of certain other waveform-controlled welding processes. The short condition typically corresponds to transfer of weld material, while the arc condition corresponds to injection of electrical energy to form a molten portion of weld metal. Knowledge of the true heats during the short and arc conditions is therefore useful in monitoring the welding process and diagnosing non-optimal welding performance.

With continuing reference to FIGS. 1–5 and with particular reference to FIG. 6, each sample n of the measurement snip is characterized as corresponding to a short condition or an arc condition in a decision 86. The decision 86 suitably decides between arc or short based on the sampled instantaneous voltage $V_n$, using a threshold voltage $V_{th}$ which is a minimum voltage judged capable of sustaining an arc. Hence, instantaneous voltage samples $V_n$ which are below the threshold $V_{th}$ are classified as corresponding to the short condition, while instantaneous voltage samples $V_n$ which are above the threshold $V_{th}$ are classified as corresponding to the arc condition.

In an arc heat integration 88, the samples corresponding to the arc condition are integrated to compute a sample arc true heat. The integration is suitably performed as:

$$\text{Arc Sample True Heat} = T_{samp} \times \sum_{na} (I_{na} \times V_{na}) \quad (3)$$

where na designates samples that correspond to the arc condition. Similarly, the samples corresponding to the short condition are integrated 90 to compute a sample short true heat according to:

$$\text{Short Sample True Heat} = T_{samp} \times \sum_{ns} (I_{ns} \times V_{ns}) \quad (4)$$

where ns designates samples that correspond to the short condition. Equations (1)–(4) are written assuming a constant sampling frequency $f_{samp}$ corresponding to a constant sampling interval $T_{samp}$. However, these equations are readily modified by those skilled in the art to accommodate a non-uniform sampling rate.

It will also be appreciated that the arc sample true heat and the short sample true heat will typically sum to equal the sample true heat over the snip. That is, adding the results of equations (3) and (4) produces the result of equation (1). Hence, optionally the integration 82 is replaced by a summation of the outputs of the integrations 88, 90. More generally, any selected two of the integrations 82, 88, 90 are sufficient to compute the output of the third integration by suitably adding or subtracting the selected two integration outputs.

With continuing reference to FIGS. 1–5 and with particular reference to FIG. 6, the sample true heats calculated in the integrations 82, 88, 90 are each extrapolated 94 to include the unsampled delay period $T_{delay}$. The extrapolation can be performed in various ways. In one suitable embodiment, the average power is computed in accordance with equation (2) and multiplied by the welding process interval $T_{weld}$ to obtain an estimate of the true heat generated over the welding process.

In another suitable embodiment of the extrapolation 94, the sample true heat given by equation (1), the arc sample true heat of equation (3), and the short sample true heat of equation (4) are each scaled by a multiplicative scaling factor S given by:

$$S = \frac{T_{snip} + T_{delay}}{T_{snip}} \quad (5)$$

where $T_{snip}$ is the snip measurement time interval and $T_{delay}$ is the unsampled delay time interval computed in the delay computation 80. For example, if $T_{snip}$=50 msec and $T_{delay}$=100 msec then S=3, and so the sample true heat computed in equations (1), (3), and (4) are each scaled upward by a factor of 3 to compute the true heat for the interval $T_{snip}+T_{delay}$.

For a timing arrangement such as that shown in FIG. 4 in which a single snip measurement interval $T_{snip}$ together with a single unsampled delay interval $T_{delay}$ spans the welding process operating period $T_{weld}$, it will be recognized that the numerator of equation (5) corresponds to the welding process interval $T_{weld}$, and so scaling by the factor S corresponds to scaling by a ratio of the welding period $T_{weld}$ to the snip measurement period $T_{snip}$.

In yet another suitable extrapolation 94, the sample true heat given by equation (1), the arc sample true heat of equation (3), and the short sample true heat of equation (4) are each extrapolated to compute corresponding true heats for the unsampled delay period $T_{delay}$ according to:

$$\text{True Heat Over Delay Period} = (\text{Sample True Heat}) \times \frac{T_{delay}}{T_{snip}} \quad (6)$$

and the true heat over the delay period $T_{delay}$ given by equation (6) is added to the sample true heat to obtain the true heat over the time interval $T_{snip}+T_{delay}$. For example, if $T_{snip}$=50 msec and $T_{delay}$=100 msec then the sample true heat is scaled by a factor of 2 to obtain the true heat over the delay period $T_{delay}$.

For a timing diagram such as that shown in FIG. 5, in which there are multiple snip measurement periods $T_{snip}$ and corresponding unsampled delays $T_{delay}$, the snip measurement 72, transfer 76, delay computation 80, integrations 82, 88, 90, and extrapolations 94 are suitably repeated for each snip measurement period $T_{snip}$, and the resultant true heats for the several intervals $(T_{snip}+T_{delay})$ spanning the welding process interval $T_{weld}$ are summed together to estimate a true heat for the welding process interval $T_{weld}$. Alternatively, for such a timing arrangement the snip measurement 72, transfer 76, and integrations 82, 88, 90 are repeated for each snip measurement period $T_{snip}$ to produce sample true heats corresponding to each snip measurement period $T_{snip}$, the several sample true heats are summed together, and the extrapolation 94 includes scaling the sample true heat sum based upon the weld process interval $T_{weld}$ and a sum of the snip measurement time intervals $T_{snip}$.

With continuing reference to FIGS. 1–5 and with particular reference to FIG. 6, the true heat, arc true heat, and short true heat over the welding process period $T_{weld}$ are displayed 96 on the user interface computer 40. Preferably, a ratio of the arc true heat to the short true heat is also displayed, as this ratio is a commonly-used figure of merit for arc welding processes. The displayed quantities, optionally along with other quantities of interest, are preferably stored in an arc welder log memory 98, which is suitably embodied as a log file written to a hard drive or other non-volatile storage device of the user interface computer 40.

In the described preferred embodiments, the time-limiting sub-process of the true heat estimation process is the communication 76 of the snip samples 74 from the power supply 12 to the computer 40. However, in other embodiments a different sub-process can be time-limiting. For example, in an alternative embodiment in which the power supply includes an integral digital processor that performs the true heat computation, the time-limiting sub-process may be the sample integration computations, rather than data transfer. In this embodiment, the snip measurement time $T_{snip}$ and the delay time $T_{delay}$ are suitably selected to provide sufficient time during the delay $T_{delay}$ to perform the time-limiting integration computations.

Figure 7:
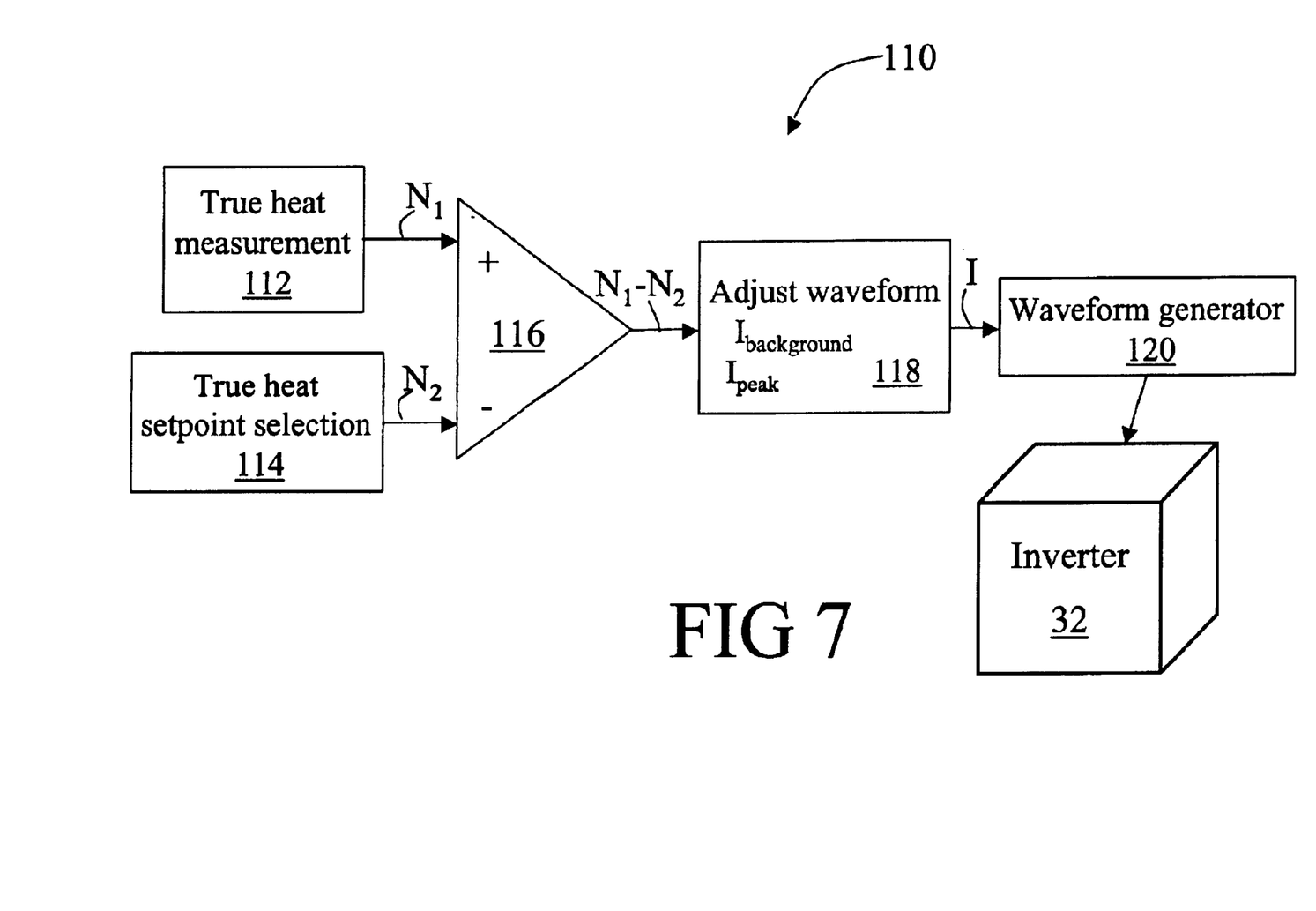
FIG. 7 shows a preferred apparatus for controlling true heat in welding.

With reference to FIG. 7, in an exemplary pipe welding process a suitable closed loop system 110 for actively controlling the waveform F to maintain a desired arc or weld true heat during the total weld cycle around a pipe is described. A true heat measurement sub-system 112 measures and outputs a measured true heat $N_1$, which is preferably a digital value. The true heat measurement sub-system 112 preferably obtains the true heat in accordance with the preferred true heat estimation methods described previously with reference to FIGS. 1–6 and equations (1)–(6). The true heat $N_1$ is an arc true heat, a short true heat, or the total true heat. The true heat $N_1$ is compared with a desired or setpoint true heat $N_2$ output, also preferably digital, by a true heat setpoint selection sub-system 114. The comparison is suitably performed by a comparison processor 116 which outputs a digital difference control signal $N_1-N_2$.

A controller 118 receives the difference control signal $N_1-N_2$ and adjusts a welding parameter based thereon. In the system 110, the controller 118 adjusts a current amplitude parameter I of the waveform F. The current amplitude parameter I is, for example, a waveform background current $I_{background}$ or a waveform peak current $I_{peak}$. The controller output I is input to a waveform generator 120 which produces a pulse-width modulated control signal that is adjusted based on the controller output I. The pulse-width modulated control signal is input to the inverter 32 shown in FIG. 1 which generates waveform-controlled welding power.

The closed loop control system 110 controls a current amplitude parameter of waveform F. However, the arc, short, or total true heat, or a combination thereof, can also be used to control other welding parameters, such as the wire feed speed, which affect the true heat delivered to the weld.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method for controlling a welding process, the control method including:

measuring a snip of current and voltage samples over a measured portion of the welding process;

computing based on the snip a true heat produced during the measured portion of the welding process;

extrapolating the true heat produced during the measured portion over an unmeasured portion of the welding process to produce a true heat value; and adjusting a welding process parameter based on the true heat value.

2. The control method as set forth in claim 1, wherein the adjusted welding process parameter is a waveform amplitude parameter of the welding process.

3. The control method as set forth in claim 1, wherein the welding process is a surface tension transfer welding process.

4. The control method as set forth in claim 1, wherein the adjusting of a welding process parameter based on the true heat value includes:

comparing the true heat value with a desired true heat value to produce a welding control signal; and adjusting the welding process parameter based on the welding control signal.

5. The control method as set forth in claim 4, wherein the computing based on the snip of a true heat produced during the measured portion of the welding process includes computing one of a true heat in the arc and a true heat in the short, and the desired true heat value is a corresponding one of a desired true heat in the arc and a desired true heat in the short.

6. The control method as set forth in claim 5, wherein the computing of one of a true heat in the arc and a true heat in the short includes:

classifying each voltage sample as one of an arc voltage sample and a short voltage sample based on a comparison of the voltage sample with a threshold voltage; and integrating one of a product of each arc voltage sample times a corresponding current sample and a product of each short voltage sample times a corresponding current sample to compute the one of a true heat in the arc and a true heat in the short.

7. A closed-loop control system for a welder that performs a waveform-controlled electric arc welding process, the control system comprising:

a sampling circuit that samples instantaneous current and voltage values of the waveform-controlled electric arc welding process during a snip interval;

a true heat processor that computes a true heat over the snip interval and extrapolates a true heat over the snip interval plus a delay interval;

a true heat setpoint adjustment that outputs a selected setpoint true heat value; and a controller that controls a parameter of the waveform-controlled electric arc welding process based on the extrapolated true heat over the snip interval plus the delay interval and the selected setpoint true heat value.

8. The control system as set forth in claim 7, wherein the welder performs pipe welding.

9. The control system as set forth in claim 7, wherein the controller includes:
a comparator that outputs a difference control signal corresponding to a difference between the true heat over the snip interval plus the delay interval and the selected setpoint true heat value; and
a waveform current amplitude adjustment processor that adjusts a waveform current amplitude parameter based on the difference control signal.

10. The control system as set forth in claim 9, wherein the waveform current amplitude parameter is one of a background current parameter and a peak current parameter.

11. The control system as set forth in claim 7, wherein the true heat processor includes:
a threshold comparator that compares each sampled instantaneous voltage value with a threshold voltage to classify each voltage value as one of a short voltage value and an arc voltage value; and
an integrator that integrates voltage times current values including at least one of the short voltage values and the arc voltage values to compute the true heat over the snip interval.

12. A closed-loop control system for a welder that performs a waveform-controlled electric arc welding process, the control system comprising:
a sampling circuit that samples current and voltage values of the waveform-controlled power during a snip measurement interval;
a voltage sample thresholding circuit that selects voltage sample values corresponding to one of a short condition and an arc condition;
a true heat processor that computes a true heat over the snip measurement interval by integrating a product of voltage sample values selected by the voltage sample thresholding circuit and corresponding current sample values to estimate a true heat in one of the arc and the short; and
a controller that adjusts the waveform-controlled electric arc welding process to maintain the estimated true heat at a desired value.

13. The control system as set forth in claim 12, wherein the controller adjusts one of a waveform amplitude parameter and a wire feed speed.

14. A method for estimating a true heat of a welding process performed over a welding process interval, the method comprising:
(a) sampling a voltage and a current applied by the welding process over a snip measurement interval that is smaller than the welding process interval;
(b) multiplying corresponding sampled voltage and current values to generate sampled power values;
(c) integrating the sampled power values over the snip measurement interval to compute a sampled true heat produced during the snip measurement interval; and
(d) based on the sampled true heat produced during the snip measurement interval, estimating the true heat of the welding process produced during the welding process interval.

15. The method as set forth in claim 14, further including:
transferring sampled voltage and current values to a processor that performs the multiplying (b), the integrating (c), and the estimating (d), wherein the transferring occurs at a transfer rate that is less a sampling rate of the sampling (a).

16. The method as set forth in claim 14, wherein the estimating (d) includes:
extrapolating the sampled true heat over an unsampled delay interval during which the welding process continues but is unsampled to obtain an unsampled true heat produced during the unsampled delay interval; and
summing the sampled true heat plus the unsampled true heat to compute the estimated true heat produced over the welding process interval.

17. The method as set forth in claim 14, wherein the estimating (d) includes:
multiplying the sampled true heat by a factor S given by:

$$S = \frac{T_{snip} + T_{delay}}{T_{snip}}$$

where $T_{snip}$ is the snip measurement interval and $T_{delay}$ is an unsampled delay interval during which the welding process continues but is unsampled, to compute the estimated true heat produced over the welding process interval.

18. The method as set forth in claim 14, wherein the estimating (d) includes:
(i) dividing the sampled true heat by the snip measurement interval to obtain an average power; and
(ii) multiplying the average power by the welding process interval to compute the estimated true heat of the welding process produced during the welding process interval.

19. The method as set forth in claim 14, further including:
for each sampled power value, classifying the sampled power value as one of a short power value and an arc power value;
integrating the short power values over the snip measurement interval to compute a sampled true heat in the short during the snip measurement interval;
integrating the arc power values over the snip measurement interval to compute a sampled true heat in the arc during the snip measurement interval;
based on the sampled true heat in the short, estimating a true heat produced in the short during the welding process interval; and
based on the sampled true heat in the arc, estimating a true heat produced in the arc during the welding process interval.

20. The method as set forth in claim 19, wherein the classifying of the sampled power value as one of a short power value and an arc power value includes:
comparing the corresponding sampled voltage value with a threshold value, the sampled power value being classified as a short power value conditional upon the sampled voltage value being less than the threshold value, the sampled power value being classified as an arc power value conditional upon the sampled voltage value being greater than the threshold value.

21. The method as set forth in claim 14, wherein the sampling (a) occurs over a plurality of non-contiguous time intervals, and the snip measurement interval corresponds to a sum of the non-contiguous time intervals.

22. The method as set forth in claim 21, wherein the estimating (d) includes:
estimating the sampled true heat of the welding process as the sampled true heat scaled by a ratio of the welding process interval and the snip measurement interval.

23. The method as set forth in claim 14, wherein the welding process is a waveform-controlled welding process, and the snip measurement interval spans at least three waveforms.

24. An arc welding apparatus for performing a waveform-controlled arc welding process, the arc welding apparatus comprising:
  an arc welding torch that interacts with an associated weld;
  a power supply that applies a selected waveform-controlled power to the weld via the arc welding torch over a process interval, the power supply including a sampling circuit for sampling instantaneous current and voltage values of the power during a snip portion of the process interval; and
  a processor designed to (i) compute a true heat over the snip portion of the process interval, and (ii) extrapolate a true heat over the process interval based thereon.

25. The arc welding apparatus as set forth in claim 24, wherein the power supply further includes:
  an inverter that receives a pulse-width modulated control waveform and outputs the selected waveform-controlled power based thereon.

26. The arc welding apparatus as set forth in claim 24, wherein the processor includes:
  a multiplier that multiplies instantaneous current and voltage values to generate instantaneous power values;
  an accumulator that accumulates the instantaneous power values to compute the true heat over the snip portion of the process interval; and
  a scaler that scales the true heat over the snip portion of the process interval by a ratio of the process interval to the snip portion thereof.

27. The arc welding apparatus as set forth in claim 24, further including:
  a robotic apparatus that manipulates the arc welding torch.

28. The arc welding apparatus as set forth in claim 24, wherein the processor includes a graphical user interface that displays the true heat over the process interval, the graphical user interface interacting with an associated user to generate a waveform that controls the waveform-controlled arc welding process, the arc welding apparatus further including:
  a communication path that communicates the sampled instantaneous current and voltage values from the power supply to the processor.

29. A method for estimating a true heat of a welding process performed over a welding process interval, the method comprising:
  (a) sampling a voltage and a current applied to the weld over a snip interval that spans at least a portion of the welding process interval;
  (b) multiplying corresponding sampled voltage and current values to generate sampled power values;
  (c) classifying each sampled power value as one of a sampled short power value and a sampled arc power value;
  (d) computing a true heat in the short over the welding process interval based on the sampled short power values; and
  (e) computing a true heat in the arc over the welding process interval based on the sampled arc power values.

30. The method as set forth in claim 29, further including:
  summing the true heat in the short and the true heat in the arc to produce a true heat of the welding process over the welding process interval.

31. The method as set forth in claim 29, wherein the computing (d) includes integrating the sampled short power values, and the computing (e) includes integrating the sampled arc power values.

32. The method as set forth in claim 31, wherein the snip interval is smaller than the welding process interval, the computing (d) includes scaling the integrated sampled short power values by a ratio of the welding process interval and the snip interval, and the computing (e) includes scaling the integrated sampled arc power values by a ratio of the welding process interval and the snip interval.

33. An open root pipe welding method including:
  performing an open root pipe welding process;
  measuring a snip of current and voltage samples during a measured portion of the open root pipe welding process;
  computing based on the snip a true heat produced during the measured portion of the open root pipe welding process;
  extrapolating the true heat produced during the measured portion over an unmeasured portion of the open root pipe welding process to produce a true heat value; and
  adjusting a welding process parameter of the open root pipe welding process based on the true heat value.

34. The open root pipe welding method as set forth in claim 33, wherein the performing an open root pipe welding process includes:
  performing a surface tension transfer welding process.

35. The open root pipe welding method as set forth in claim 33, wherein the adjusting of a welding process parameter includes:
  comparing the true heat value with a desired true heat value to produce an open root welding control signal; and
  adjusting the welding process parameter based on the open root welding control signal.

* * * * *